Patented Oct. 28, 1924.

1,513,316

UNITED STATES PATENT OFFICE.

MARGUERITE D. EASTON, OF NEW YORK, N. Y.

COMPOSITION OF MATTER FOR TREATING FIBROUS MATERIAL.

No Drawing.   Application filed March 23, 1923.  Serial No. 627,220.

*To all whom it may concern:*

Be it known that I, MARGUERITE D. EASTON, a citizen of Canada, and a resident of the city of New York, borough of Manhattan, in the county and State of New York, have invented a new and Improved Composition of Matter for Treating Fibrous Material, of which the following is a full, clear, and exact description.

This invention relates to a new and improved composition of matter for the treatment of fibrous material, such as wool, flax, cotton, hemp, ramie, jute, and the like.

An object of the invention is to provide a simple, economically manufactured composition of matter whereby the above-mentioned materials may be easily cleaned, scoured and decorticated by a simple process involving a minimum amount of labor and skill on the part of the operator.

Another object resides in the provision of a composition which can be used for the treatment of the above-mentioned materials without destroying the fineness of the material or weakening its structural strength.

Another object concerns the provision of a composition which is produced in the form of a cake and can, therefore, be easily handled.

It should be understood in the consideration of this invention that the applicant in reciting specific ingredients is only being so specific in order that a preferred example of the embodiment of the invention may be set forth for the benefit of those skilled in the art. It is to be clearly understood that variations may be made in the character and kind of materials used, in the proportions of these materials employed, and in the particular manner in which these ingredients are related in the process of their manufacture and use.

It has long been desired to treat fibrous material, such as wool, hemp, flax, etc., without necessarily employing the several steps now thought to be necessary in order to properly scour them. To that end I have provided a composition which, by being placed in the desired quantity in boiling water until thoroughly mixed therewith, is efficient to scour such materials merely by placing them therein and leaving them for a period of time the length of which is determined not definitely for any group of materials but depending upon the character and condition of the material being treated.

This composition, preferably, is made in the form of soap, that is to say, in blocklike cakes which can be poured or cast and cut up as desired and as easily handled as ordinary soap. As an example of the general type of ingredients which I employ in the formation of my composition, I refer to the following ingredients which are typical of various groups of ingredients which may be used: Irish moss, paraffin, borax, stearic acid, sodium carbonate and carbonate of potash. It will be noted that the Irish moss is characteristic of a gelatinous or jellifying ingredient; that the paraffin is characteristic of a solid hydrocarbon or oil; and that the other ingredients are characteristic ingredients of a weak alkali soap. These ingredients are mixed together in a manner hereinafter to be described and when treated in this manner and allowed to cool will harden so that the composition can be cut up into cakes and stored for future use.

In manufacturing the composition I wish to refer to one specific form which it may take in which I employ approximately eight ounces of Irish moss jelly, approximately two ounces of paraffin, approximately two ounces of borax, approximately two ounces of stearic acid, approximately two ounces of soda ash, approximately two ounces of sal soda, approximately one-half ounce of carbonate of potash, and approximately twenty ounces of water. It is, of course, understood that the specific proportions of these ingredients may be varied within reasonable limits, because the proportions which would be suitable for the treatment of one kind of wool may have to be varied slightly for the proper treatment of another kind of wool; and, moreover, with the same kinds of wool, one may require variations in the proportions because it is dirtier than the other. These variations in the samples may also require a variation in the length of treatment, so that it is impossible to specify an absolute period of treatment for all materials.

It will be observed that Irish moss is typical of a group of materials which are gelatinous or jelly-forming and seemingly have the power to conteract a too strong action of the alkali in a soap, so that when added to an alkali soap they act as a check on the too great action of the alkali so that the materials being treated are not injuriously affected. To some extent such an ingredient also acts to give body to the composition, so that a firm cake is formed. The other ingredients are characteristic of a number of ingredients which can be used to form an alkali soap. The paraffin is indicative of a group of materials which are solid hydrocarbons or oil, which are mainly intended to act as stiffeners to give the substance body and to some extent to offset the action of the alkali.

In the preparation of the composition I take the jellifying ingredients and the heavy oil or solid hydrocarbons and place them in the proper amount of water, preferably boiling, until they are thoroughly mixed, and then add the soap ingredients until the entire group of ingredients is thoroughly mixed, when I allow the mixture to cool and harden, whereupon it can be cut up into cakes.

It will thus be seen that I have provided a simple and efficient composition which can be easily and economically manufactured and as easily used with a minimum of labor and skill required on the part of the persons so employing it.

In the use of the composition, it is placed in definite quantities of water, the ratio of the composition to the quantity of water varying from 1-to-16 to 1-to-64. The desired amount of composition is placed in the requisite amount of water and this is brought to a vigorous boil, at which time the cake will dissolve in the water. It will be observed that the most preferred form of the invention includes the preparation of approximately equal parts of alkali soap, as compared with a jellifying ingredient, and a heavy or solid hydrocarbon. The treatment of the material merely consists in placing it in a vat or container or kettle, holding the solution at the proper temperature and allowing it to remain in the vat a length of time sufficient to remove all dirt and undesirable ingredients. As I have said before, the length of time which any particular material should be treated is a matter of experience, determined by a knowledge of the characteristics of each material to be treated. Some materials may be treated in a few minutes and others may take a considerably longer time.

What I claim is:—

1. A composition of matter for the treatment of fibrous material, such as wool, flax, hemp and the like, which includes approximately eight ounces of Irish moss, approximately two ounces of paraffin, approximately twenty ounces of water, and approximately nine ounces of other ingredients, said other ingredients consisting of borax, stearic acid, soda ash, sal soda, and carbonate of potash.

2. A composition of matter for the treatment of fibrous material, such as wool, flax, hemp, etc., which includes eight ounces of Irish moss jelly, two ounces of paraffin, two ounces of borax, two ounces of stearic acid, two ounces of soda ash, two ounces of sal soda, one-half ounce of carbonate of potash, twenty ounces of water.

MARGUERITE D. EASTON.